United States Patent [19]
Glasgow et al.

[11] 3,938,960
[45] Feb. 17, 1976

[54] EXTERNAL FLUID CATALYTIC CRACKING UNIT REGENERATOR PLENUM MANIFOLD

[75] Inventors: Philip E. Glasgow; Nathan Gilbert, both of Houston, Tex.

[73] Assignee: Pullman Incorporated, Chicago, Ill.

[22] Filed: Jan. 16, 1975

[21] Appl. No.: 541,680

[52] U.S. Cl............ 23/288 B; 23/288 S; 208/161; 55/342; 55/345; 55/346; 55/349; 252/417
[51] Int. Cl.²...................... B01J 8/18; B01D 45/12
[58] Field of Search............ 23/288 B, 288 G, 288 S, 23/284; 285/187, 67, 140, 192, 47; 252/417; 208/161; 55/342, 345, 346, 349

[56] References Cited
UNITED STATES PATENTS

| | | | |
|---|---|---|---|
| 2,419,245 | 4/1947 | Arveson | 23/288 S |
| 2,534,778 | 12/1950 | Kuhn | 23/288 S |
| 2,895,906 | 7/1959 | Harper | 55/342 UX |
| 3,254,476 | 6/1966 | Kusek et al. | 285/187 X |

Primary Examiner—James H. Tayman, Jr.

[57] ABSTRACT

An improvement in a regenerator which incorporates an external plenum on the exterior of the regenerator apparatus for receiving and collecting the flue gases separated from regenerated catalyst by a plurality of cyclone separators or other separating apparatus is disclosed. The external plenum communicates by means of stand pipes through the wall of the regenerator. This supports the cyclone separators or other separating means mechanically and avoids certain thermal stresses which would otherwise occur in the plenum if it were placed on the interior of the regeneration chamber.

8 Claims, 5 Drawing Figures

EXTERNAL FLUID CATALYTIC CRACKING UNIT REGENERATOR PLENUM MANIFOLD

PRIOR ART

U.S. Patents:

| | | |
|---|---|---|
| 2,929,774 | 2,730,508 | 2,891,001 |
| 2,312,230 | 2,491,407 | 3,152,066 |
| 3,161,583 | 3,206,393 | 3,412,014 |
| 3,494,858 | 3,563,911 | 3,647,714 |
| 3,661,799 | 3,661,800 | 3,806,324 |

BACKGROUND OF THE DISCLOSURE

In fluid catalytic cracking units, the reaction normally involves intimate contact of a finely divided particulate catalyst with a feed stock. The catalyst is subsequently separated from the converted feed stock. The process occurs at high temperatures and as a consequence, some combustion occurs which creates carbonaceous coatings such as coke. This normally accumulates on the catalyst. The catalyst is typically delivered to a regeneration chamber where a controlled volume of air is introduced to burn the coke. This burning must occur at a temperature sufficiently high to convert the coke into carbon monoxide or carbon dioxide. The temperature must be suppressed sufficiently to prevent the regeneration operation from exceeding temperatures at which the catalyst is damaged. High temperatures will deactivate the catalyst. Normally the regeneration process includes the step of separating flue gases in the regeneration chamber from the finely divided particulate catalyst. This is customarily accomplished in cyclone separators, sometimes in a single stage and other times in a series of separators. Often cyclone separators will be installed in parallel. They return the catalyst to a place of accumulation where it is recirculated back to the reactor. The separators have two outlets, the second devoted to flue gas disposal.

Regenerators are normally quite large and typically require several cyclone separators. The flue gas volume is quite substantial and a flue gas disposal pipe or stack is required. This comprises a substantial portion of apparatus normally placed in a regenerator. The regenerator operates at substantially elevated temperatures, typically in excess of 1,000°F. These elevated temperatures cause expansion of all of the components of the regenerator, including the cyclone separators and associated equipment. Elevation in temperature carries with it the consequential thermal expansion on heating and contraction on cooling.

The present invention provides an improvement for a regenerator. It is particularly directed to the upper portions of the regenerator, and cooperates with the specified number and type of separator means. Avoidance of hot spots in the upper portions of the regenerator may require the operation of six or more cyclone separators located at strategic locations. The present invention ably accomodates any number of separator means and vagaries of placement.

SUMMARY OF THE INVENTION

The present invention is an improvement in regenerators. It contemplates cooperation with a regenerator typically having a closed pressure vessel in which spent catalyst is introduced. The coke or other carbon materials thereon is controllably burned, so long as temperatures do not climb too high, in the upper portions of the regenerator in a dilute phase comingled with flue gases, and the catalyst and flue gases are separated by some separator means such as a cyclone separator. The number and position of the cyclone separators is not a limiting factor on the present invention. The present invention contemplates installation of an external plenum serving as a common manifold for all the cyclone separators, whether having single, secondary, or tertiary stages. The manifold can be an encircling ring or formed of straight line segments or portions. The manifold preferably connects through a number of generally vertical stand pipes which extend through the wall of the regenerator chamber. The stand pipes provide mechanical support and positioning for the separators within the chamber. Flue gas separated by the separators is conducted out of the separators through the stand pipes and into the plenum.

DESCRIPTION OF THE PREFERRED EMBODIMENTS

Figure 1:
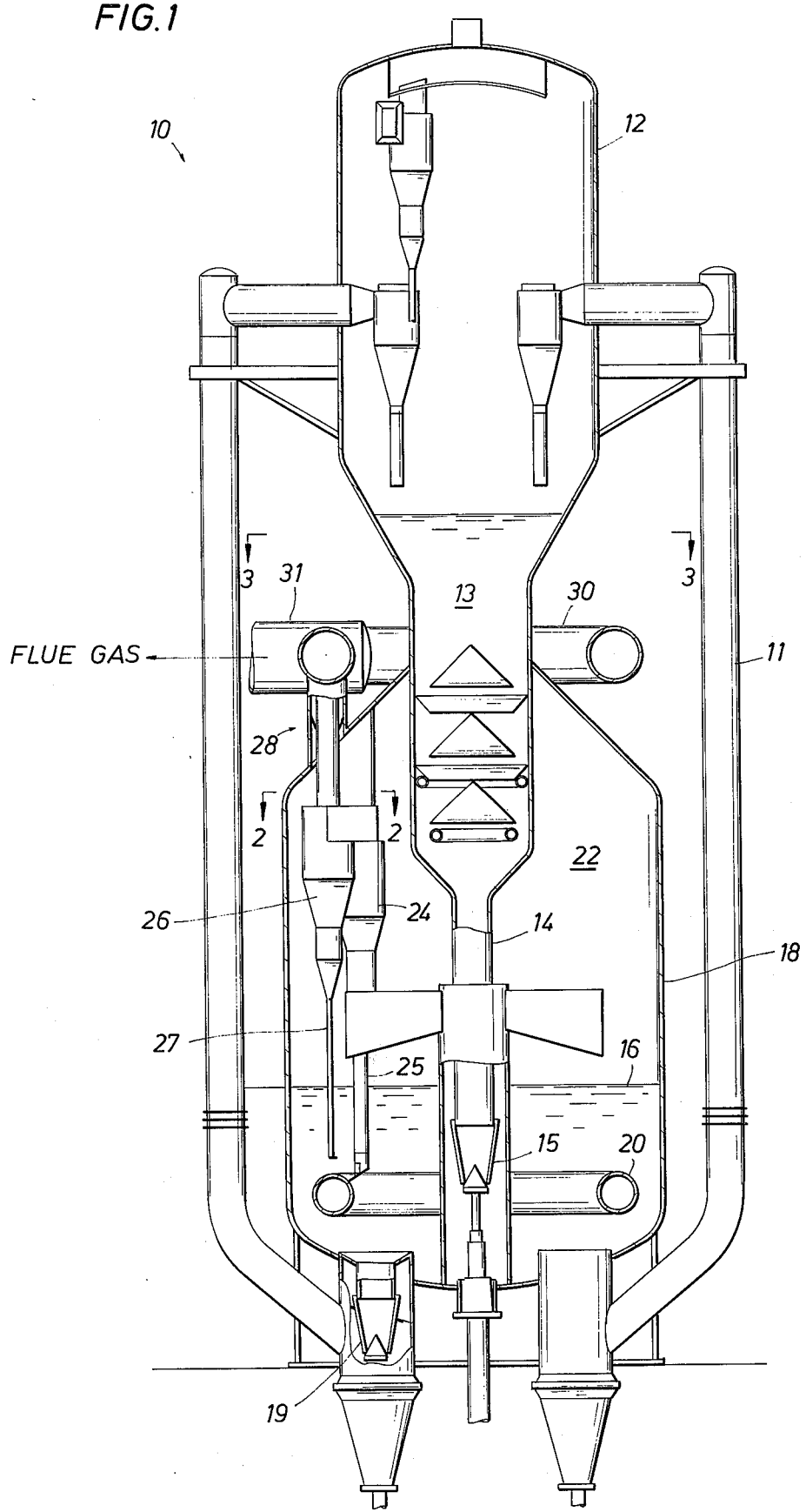
FIG. 1 is a sectional view through one form of reactor and regenerator system shown jointly, particularly illustrating the present invention installed in communication with a number of separators within the regenerator chamber.

FIG. 1 discloses the present invention installed or incorporated within a fluid catalytic cracking unit. A fluid catalytic cracking unit is shown at 10. A reactor 11 receives an up-flow of feed stock and a finely divided particulate catalyst. The catalyst is typically a newer zeolite catalyst. It is finely divided, having a diameter in the range of several microns. As is customarily anticipated, it travels to a disengager 12 which conducts spent catalyst to a stripper 13. The stripper 13 delivers the spent catalyst through a conduit 14 downward to a suitable valve 15. A catalytic bed 16 is shown on the interior of a regenerator chamber 18. The catalyst is removed from the bed 16 through a valve 19 and introduced into the reactor 11 for repetitive cycling through the equipment.

Air is normally introduced through an encircling manifold 20 into the dense phase catalytic bed 16. The oxygen in the air converts a portion of the carbon or coke coating the individual particles of catalyst. A substantial portion of the catalyst is rejected from the dense bed 16 and enters into a dilute phase regeneration in the upper portions 22 of the chamber. The dilute phase catalyst is comingled with flue gases. These are inducted into a first cyclone separator 24. It has a downwardly directed return conduit 25 for returning the reactivated catalyst to the fluid bed 16. Flue gases from the cyclone separator 24 are then conducted to a second stage separator 26. The second separator 26 has a downwardly directed conduit 27 which returns that portion of the catalyst to the fluid bed 16 which was not separated by the first stage separator 24. Two separators arranged in series are typical although they are not a limitation on the present invention. It is adapted to work with a single separator or two in series. Sometimes three will be used, but this is rare. The separator 26 connects to a stand pipe assembly 28 which extends upwardly through the shell or housing 18 of the regenerator.

The typical regenerator will have a number of separator means incorporated therein. They typically must be evenly spaced in the upper reaches of the chamber 22. Each preferably incorporates a stand pipe 28 which extends to the exterior. On the exterior, an encircling ring-like plenum 30 is preferably concentrically arranged and connected to all of the separator means. The plenum 30 gathers the flue gases from all of the separator means. The ring 30 preferably encircles the regenerator 18 and is preferably located thereabove so that flue gases may rise to the ring 30. They rise through the stand pipes and are collected within the ring. A conduit or pipe 31 conveys the flue gases to another location for disposal. If the chemical make-up is acceptable, it can be vented to atmosphere through a smoke stack or the like. Otherwise, subsequent treatment of the flue gases may be advisable.

The ring 30 is positioned and supported by the stand pipe 28. The ring 30 is positioned on the exterior of the regenerator. On the exterior, it is subjected to atmospheric cooling. While the gases may be quite hot, ranging typically over 1,000°F, the ring itself operates at substantially cooler temperatures. Its external location enables the ring 30 to serve as a support for the separator means. In the preferred embodiment, the ring 30 is preferably arranged directly over the cyclone separators. Where a single stage separator is used, it is desirable to use a straight stand pipe 28 extending axially of the separator to the ring. In some circumstances, it may be necessary to deviate from the vertical as in the instance where external structural members may interfere. The preferred vertical arrangement converts the stand pipe into a chimney, as it were, and provides an overhead hanger construction for the cyclone separator.

Figure 2:
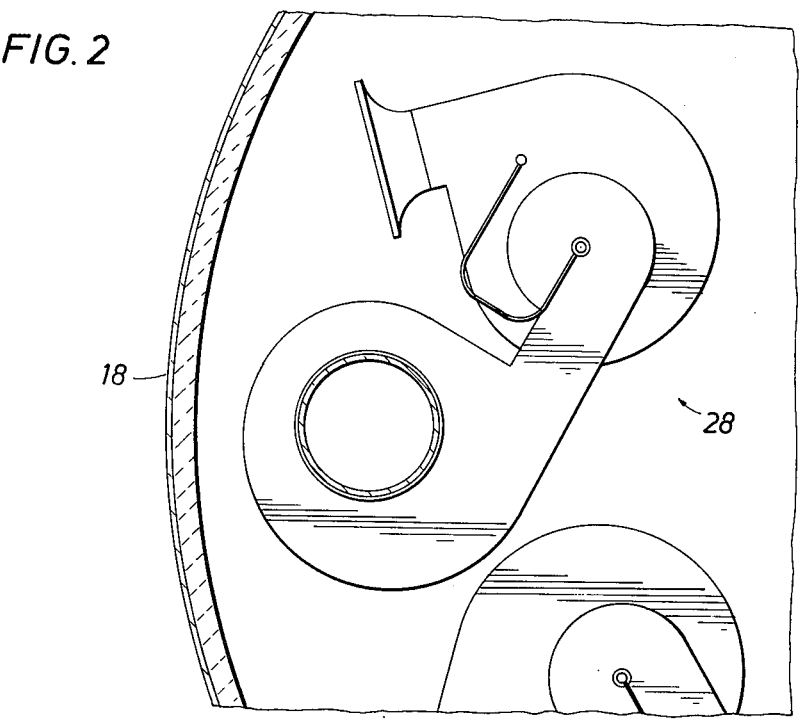
FIG. 2 is a sectional view along the line 2 — 2 of FIG. 1 showing typical internal placement of separators to provide fairly uniform withdrawal of flue gases and regenerated catalysts from the dilute phase occurring in the upper portions of the regenerator chamber.

In FIG. 2, the several cyclone separators found in the regenerator 18 are shown. They are evenly spaced about a circle and are all preferably arranged on a common radius from the vertical axis of the regenerator 18. Each one is preferably provided with an inlet for inducting catalyst and flue gases. FIG. 2 illustrates the use of pairs of separators serially arranged.

Figure 3:
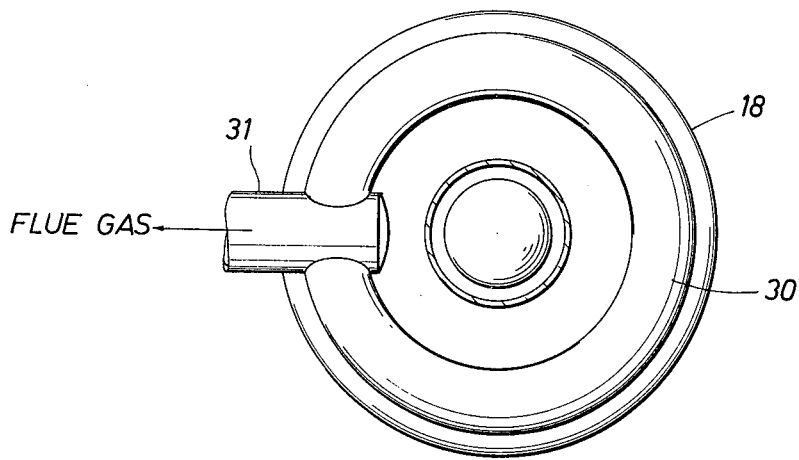
FIG. 3 is a sectional view along the line 3 — 3 of FIG. 1 showing the external plenum of the present invention having the shape of an encircling ring on the exterior of the regenerator.

FIG. 3 shows the concentric arrangement of the ring 30. The ring is preferably perfectly circular and is concentric around the circular construction of the regenerator 18. In the regenerator illustrated, the upper portion 22 tapers in a conic section to a relatively narrow neck at the stripper 13. This design detail may differ in other installations. It is preferable that the ring 30 be positioned vertically above the separators with stand pipes 28 connected vertically to the ring. Normally this can be accommodated by emergence of the stand pipe through the top side of the regenerator 18.

Figure 4:
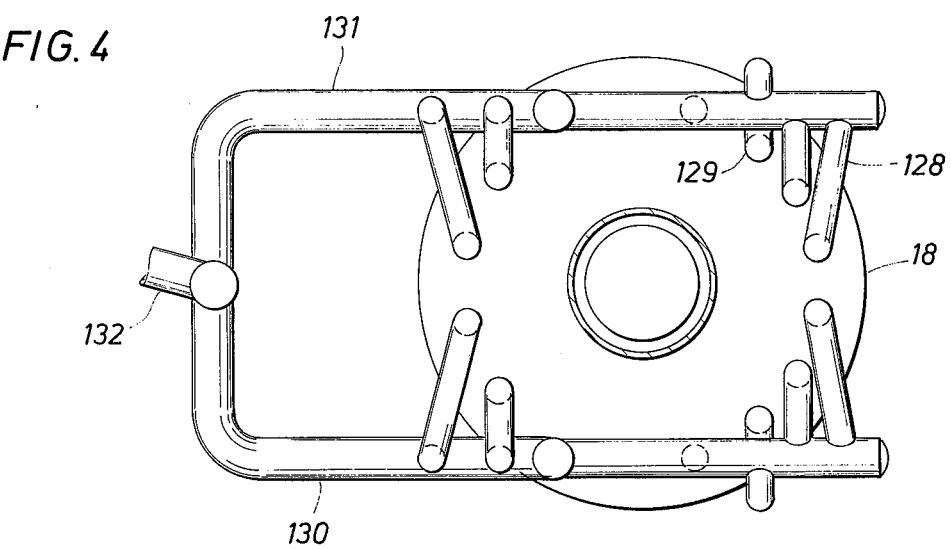
FIG. 4 is a view similar to FIG. 3 showing an alternative embodiment wherein the external plenum is formed of a pair of preferably parallel straight line pipe segments connected by stand pipes of different lengths and extending at various angles to the separator means found in the regenerator chamber therebelow; and, FIG. 5 is a detailed view of a stand pipe extending from a separator within the regenerator chamber to the external plenum of the present invention.

FIG. 4 is a sectional view similar to FIG. 3 but illustrating an alternative embodiment of the present invention. The pressure vessel 18 is again shown. Stand pipes 128 and 129 are substantially vertical but they differ in length and angle. They connect to external plenums 130 and 131. The plenums 130 and 131 are preferably similar in size and placement, being located symmetrically parallel to a diameter through the vessel 18. The plenum uses two straight pipes 130 and 131. They join together and connect with a flue gas disposal pipe 132.

FIG. 4 should be contrasted with FIG. 3. FIG. 4 discloses an external flue gas plenum as taught by the present invention. FIG. 3 discloses what is preferably a circular plenum and FIG. 4 discloses a straight plenum. The stand pipes 128 and 129 differ in length and angle to accommodate the relative remoteness from the flue gas plenum. Presuming that cyclone separators are located symmetrically on a common circle in the regenerator 18, each straight plenum is connected with similar stand pipes.

Figure 5:
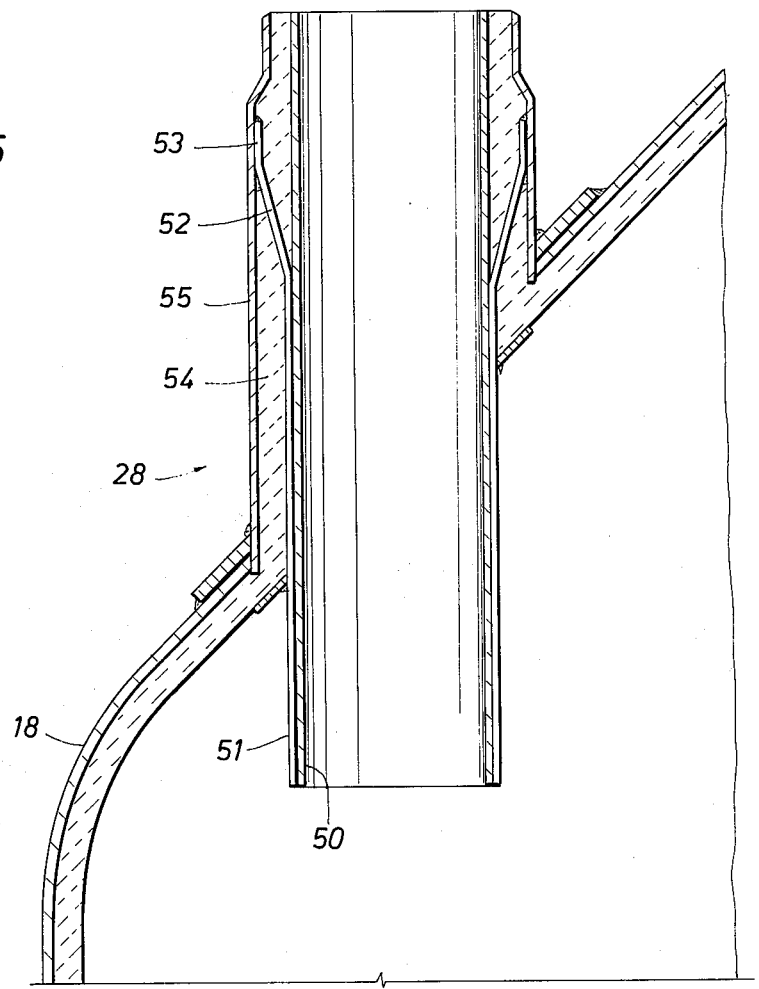

Attention is directed to FIG. 5 where the stand pipe 28 is shown in greater detail. It preferably incorporates an internal insulation sleeve 50 and an external metal pipe hanger 51. The pipe hanger 51 is circular at its lower portions. It is joined to the internal pipe liner 50. Insulating material 54 surrounds the pipe hanger 51. The insulation material, typically a ceramic, is captured within a concentrically located upright external shell member 55. The pipe hanger 51 flares outwardly at 52 and has a concentric upstanding portion of larger diameter at 53. The flared portion 52 provides transition from a given diameter to a larger diameter to thereby enable the tab portion 53 to be welded to the external shell 55. This arrangement provides stability to the stand pipe 28. It enables the stand pipe to flex or elongate with temperature variations without damaging the insulated liner 50 or cracking the external insulation 54. As a consequence, variations in length are readily accommodated.

The precise arrangement of the separators in the regenerator is not critical. As shown in the Oct. 8, 1973, edition of the "Oil and Gas Journal" on Page 69, other shapes of reactors are shown in FIGS. 3 and 5, for example. The present invention can be used with any of these.

The foregoing is directed to the preferred embodiment of the present invention. The scope is determined by the claims which follow.

We claim:
1. For use in a regeneration chamber of upright circular construction in which a finely divided particulate catalyst is at least partly coated with a carbon material residue from its prior use as a catalyst is accumulated and the catalyst is found in a portion of the chamber in a dilute phase mixed with flue gases, the improvement comprising
  at least two cyclone separator means in the regeneration chamber, each having an inlet means communicated with the regeneration chamber for receiving a mixture of flue gas and particulate catalyst thereinto and wherein said cyclone separator means separates the flue gas and catalyst which are discharged through separate outlet means;
  an externally located flue gas plenum on the exterior of the regeneration chamber for said cyclone separator means for collecting flue gases therefrom and communicating the flue gas to a point of disposal; and a generally vertically directed standpipe connected to each of said cyclone separator means and also connected to said plenum, said stand pipe passing through a wall of the regenerator chamber and which includes:

an internal metal pipe;

an insulation coating thereon; and, hanger means connected to said pipe and extending therefrom and adopted to be connected at an exterior point to a fixed structural support.

2. The apparatus of claim 1 wherein said plenum is an encircling ring-like member around the regeneration chamber and each of said cyclone separator means is connected to said plenum by a stand pipe extending through the regeneration chamber wall.

3. The apparatus of claim 1 wherein said plenum is an elongate hollow pipe of straight line segments of substantial construction located on the exterior of the regeneration chamber, and each of said cyclone separator means is communicated to said plenum by a stand pipe extending through the regeneration chamber wall.

4. The apparatus of claim 3 wherein the regeneration chamber has a generally circular cross section and said cyclone separator means are located at spaced locations within the circular cross section, and each of said stand pipes is constructed and arranged to pass through the wall of the regeneration chamber to connect to said plenum.

5. The apparatus of claim 1 wherein said plenum is constructed and arranged to mechanically position and support said cyclone separator means on stand pipes connected therebetween wherein said stand pipes extend through the wall of the regeneration chamber.

6. The apparatus of claim 1 wherein said plenum is a ring arranged concentrically of the regeneration chamber which has a circular cross section, and said ring connects to a stand pipe extending downwardly into the regeneration chamber and connects to the outlet means for flue gas for one of said cyclone separator means.

7. The apparatus of claim 6 wherein said stand pipes connect to said ring plenum at evenly spaced circumferential locations.

8. The apparatus of claim 1 wherein said hanger encircles said pipe and is adapted to accommodate changes in size resulting from temperature changes of said pipe and consequential thermal expansion.

* * * * *